(12) United States Patent
Bussmann et al.

(10) Patent No.: US 11,661,571 B2
(45) Date of Patent: May 30, 2023

(54) SEPARATOR HAVING A GAS SUPPLY LINE FOR INTRODUCING GAS INTO LIQUID IN THE SEPERATOR DRUM AND METHOD FOR THE OPERATION THEREOF

(71) Applicant: GEA MECHANICAL EQUIPMENT GMBH, Oelde (DE)

(72) Inventors: Daniel Bussmann, Oelde (DE);
Thomas Bathelt, Oelde (DE);
Wolf-Dietrich Herberg, Witten (DE);
Tim Hundertmark, Gütersloh (DE);
Björn Ströfer, Beckum (DE)

(73) Assignee: GEA MECHANICAL EQUIPMENT GmbH, Oelde (DE)

( * ) Notice: Subject to any disclaimer, the term of this patent is extended or adjusted under 35 U.S.C. 154(b) by 873 days.

(21) Appl. No.: 16/535,432

(22) Filed: Aug. 8, 2019

(65) Prior Publication Data

US 2020/0190450 A1     Jun. 18, 2020

(30) Foreign Application Priority Data

Dec. 12, 2018   (DE) ..................... 10 2018 131 956.8

(51) Int. Cl.
| | |
|---|---|
| *C12H 1/065* | (2006.01) |
| *B04B 1/08* | (2006.01) |
| *B04B 11/02* | (2006.01) |
| *B04B 11/08* | (2006.01) |
| *C12C 11/11* | (2019.01) |

(52) U.S. Cl.
CPC ............ *C12H 1/061* (2013.01); *B04B 1/08* (2013.01); *B04B 11/02* (2013.01); *B04B 11/082* (2013.01); *C12C 11/11* (2013.01)

(58) Field of Classification Search
CPC ........... C12H 1/061; B04B 1/08; B04B 11/02; B04B 11/082; C12C 11/11; A23L 2/54
USPC ............................................... 494/10, 23, 25
See application file for complete search history.

(56) References Cited

U.S. PATENT DOCUMENTS

| | | |
|---|---|---|
| 2,230,210 A | 1/1941 | Brecour et al. |
| 4,599,239 A | 7/1986 | Wieland et al. |
| 9,789,450 B2 | 10/2017 | Schultz |
| 10,105,717 B2 | 10/2018 | Mackel et al. |
| 11,110,407 B2 | 9/2021 | Fox et al. |

(Continued)

FOREIGN PATENT DOCUMENTS

| | | |
|---|---|---|
| CH | 204938 A | 5/1939 |
| CN | 107427793 A | 12/2017 |

(Continued)

OTHER PUBLICATIONS

International Search Report dated Feb. 20, 2020 in related/corresponding International Application No. PCT/EP2019/083332 (references from ISR not cited herewith have previously been made of reference).

(Continued)

*Primary Examiner* — Shuyi S. Liu
(74) *Attorney, Agent, or Firm* — Patent Portfolio Builders PLLC

(57) ABSTRACT

A separator having a vertical rotation axis includes a rotatably mounted drum having a drum interior for centrifugal processing of a liquid. The separator also includes a gas supply line for introducing gas into the liquid, which opens into the drum interior.

14 Claims, 13 Drawing Sheets

(56) References Cited

U.S. PATENT DOCUMENTS

2014/0235422 A1* 8/2014 Isaksson .................. B04B 7/00
                                                            494/41
2016/0271626 A1* 9/2016 Bergström ............... B04B 1/08

FOREIGN PATENT DOCUMENTS

| DE | 678329 C | 7/1939 |
|---|---|---|
| DE | 696796 C | 9/1940 |
| DE | 1171822 B | 6/1964 |
| DE | 3224706 A1 | 1/1984 |
| JP | 2013086011 A | 5/2013 |
| RU | 58300 U1 | 11/2006 |
| RU | 2622946 C2 | 6/2017 |
| WO | 9005572 A1 | 5/1990 |

OTHER PUBLICATIONS

Search Report created Aug. 5, 2019 in related/corresponding DE Application No. 10 2018 131 956.8.
Search Report dated Jan. 11, 2023 in related/corresponding RU Application No. 2021116524/05(034781).

* cited by examiner

SEPARATOR HAVING A GAS SUPPLY LINE FOR INTRODUCING GAS INTO LIQUID IN THE SEPERATOR DRUM AND METHOD FOR THE OPERATION THEREOF

BACKGROUND AND SUMMARY OF THE INVENTION

Exemplary embodiments of the present invention relate to a separator method for the operation thereof.

U.S. Pat. No. 9,789,450 B2 discloses an arrangement comprising a separator in which the gas mixture is carried out before or after the separator using a different device.

On the basis of the aforementioned prior art, it is an object of the present invention to provide a more efficient possibility for the admixture of gas into a liquid.

A separator according to the invention, in particular a separator having a vertical rotation axis, comprises a rotatably mounted drum having a drum interior for centrifugal processing of a liquid. The separator comprises at least one gas supply line for introducing gas into the liquid, which opens into the drum interior. The liquid into which the gas is introduced may also merely be a separated phase as a constituent of the liquid originally introduced into the separator.

The separator allows, for example, phase separation of a liquid suspension into a plurality of phases, the separator at the same time allowing enrichment of one or more phases with one or two gases.

In contrast to the aforementioned prior art, the external mixing device described there is omitted. In the separator according to the invention the gas introduced can be better absorbed by the liquid inside the separator because of the turbulent flow prevailing there.

In this case, a gas is introduced into the suspension flow, or into a phase obtained from it, at a suitable position inside the separator, so the gas is mixed with the respective phase. In the case of supplying two gases, the dosing of gas into the suspension flow may be carried out via separate positions inside the separator, or the centrifuge.

It is furthermore possible to reduce the installation outlay and the installation area, since a previously required external mixing device is omitted.

Cleaning requirements may be configured identically for the mixing device and the centrifuge because of the compact and integrated design, which entails less certification outlay for hygienic applications.

Advantageously, the gas supply line may be configured as a supply line tube and/or as a supply line channel. This reduces the installation outlay and allows replacement of this component.

The separator may furthermore comprise a sensor for determining the gas content in the gas-containing liquid. If, for example, the gas content in two phases flowing out after phase separation is of interest, a sensor may respectively be provided for monitoring and/or determining the gas content for each phase.

To this end, the separator may comprise at least one outlet tube for discharging the gas-containing liquid from the separator, the outlet tube comprising the sensor for determining the gas content in the gas-containing liquid.

The separator may furthermore comprise a measurement and/or evaluation unit for adjusting the gas pressure of the gas supplied through the gas supply line. This may, inter alia, be carried out by means of the residence time in the separator or by means of the inlet quantity of liquid to be processed.

Particularly preferably, the separator may comprise a valve for adjusting the gas pressure of the gas supplied through the gas supply line, the valve being arranged along the gas supply line and being adjustable by means of the measurement and/or evaluation unit. In this case, the gas supply line is also assigned to the separator according to the invention in a region outside the drum of the separator.

The separator may furthermore comprise a distributor space for radial discharge of a liquid introduced axially, i.e., parallel to the rotation axis of the separator, the gas supply line opening into the distributor space.

The separator may furthermore comprise a skim chamber and the gas supply line opens into the skim chamber. In this case, the skim chamber is used for continuous discharge of a liquid phase clarified or separated in the drum of the separator.

The separator may be configured in a very wide variety of ways. If a sealed configuration is required, in this case the drum, and explicitly the separating space, may be sealed or isolated from the surroundings by friction seals, for example dry face seals, in the inlet region and/or in the outlet region. As an alternative, however, this sealing or isolation may also be carried out using fluid-mechanical seals. In the case of these seals, the sealing is produced by inserting a stationary disk into a rotating liquid ring. As an alternative, however, a rotating disk may also be inserted into a stationary liquid ring.

The separator may, in a manner known per se, comprise a drive spindle, the rotatably mounted drum being driven by means of the drive spindle. The gas supply line may in this case be configured, at least in regions, as a channel inside the drive spindle, which channel opens into the drum interior of the drum, particularly into a bottom chamber located terminally with respect to a distributor channel extending radially from the distributor chamber.

The separator may advantageously comprise at least two gas supply lines for introducing gas at two different positions of the drum. For example, a gas supply line before and after the phase separation of a suspension, and/or controlled redosing of gas to one or more separated phases, are possible. The gases may be different, for example $CO_2$, an inert gas or even HCl gas for concentration adjustment in the reprocessing of contaminated hydrochloric acid.

A precipitation reaction inside the separator may also be achieved by the gas introduction, particularly in the region of the distributor chamber or the bottom chamber. In this regard, for example, precipitation or separation of a free amine (for example as a derivative of a pharmaceutical active agent) in the form of a hydrochloride may be envisioned.

Advantageously, a first gas, for example $CO_2$, may be introduced into a liquid, after introduction of the liquid into the separator, through a first gas supply line at a first position into the drum.

A second gas, or the first gas, may furthermore be introduced into the liquid, after introduction of the latter into the separator, through a second gas supply line at a second position into the drum. The second gas may also be an inert gas which merely serves as a blanket gas.

In a preferred application, the method described above is used for carbonating beverages, in particular beer.

Further advantages, features and details of the invention may be found in the following description, in which a plurality of exemplary embodiments are explained in more detail with the aid of the appended figures. The person skilled in the art will expediently also individually consider the features disclosed in combination in the figures, the description and the claims and combine them to form suitable further combinations.

The alternative embodiments described below present different variants of the way in which a gas supply into a separator may be embodied. Components which are the same in a separator are in this case noted by the same references.

DETAILED DESCRIPTION

Figure 1:
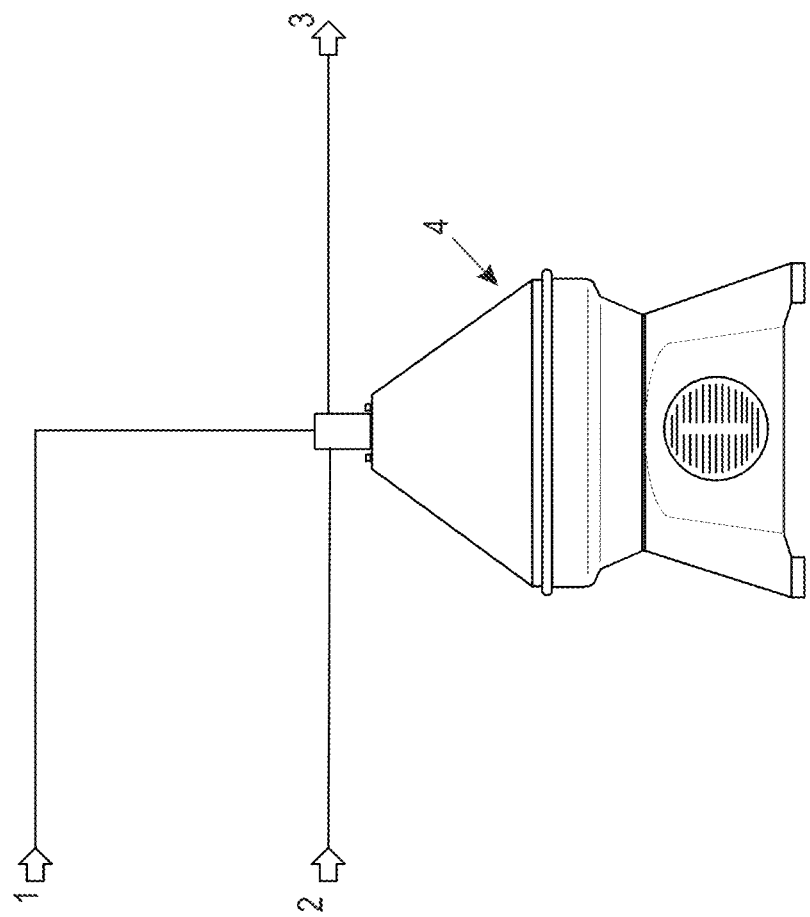
FIG. 1 is a schematic representation of a method according to the invention with the use of a separator according to the invention for the centrifugal processing of a liquid.
Figure 7:
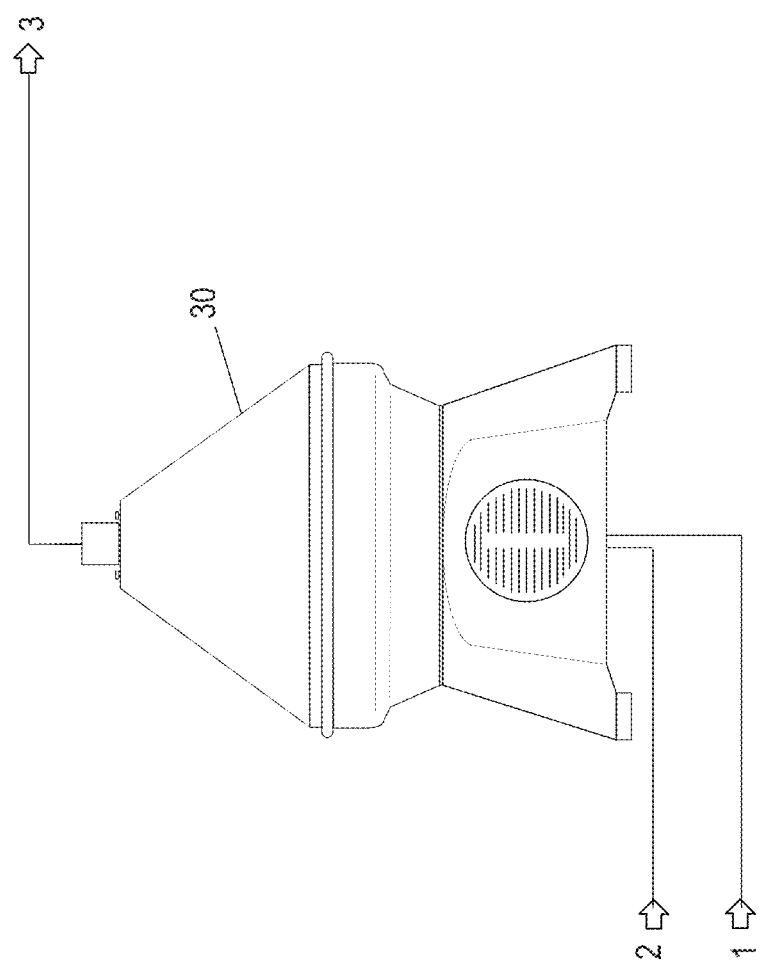
FIG. 7 is a schematic representation of a method according to the invention with the use of a further alternative embodiment of a separator according to the invention for the centrifugal processing of a liquid.
Figure 10:
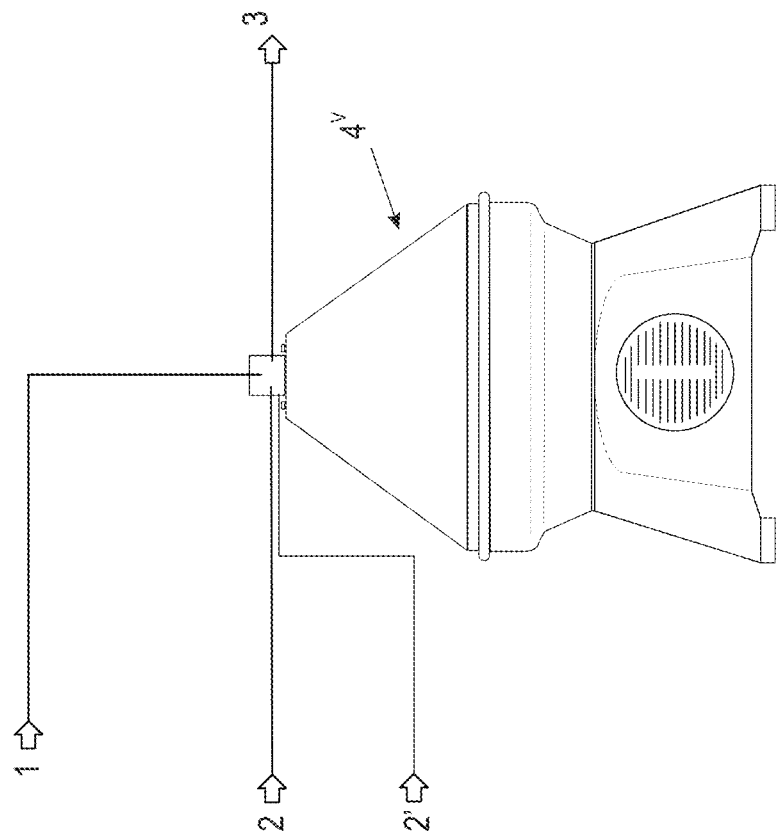
FIG. 10 is a schematic representation of a method according to the invention with the use of a further alternative embodiment of a separator according to the invention for the centrifugal processing of a liquid, using two gases.

FIGS. 1, 7, 10 are schematic representations of separators, as well as the supply and discharge lines required for the method for enriching a liquid with a gas for the production of a gas-containing liquid, in particular a beverage containing $CO_2$.

In this case, a liquid 1 is introduced into the rotating drum of a separator 4 having a vertical rotation axis. A gas is introduced into the liquid 2, or into a phase of this liquid. This is carried out inside the separator 4. A liquid 3, in which distributed gas bubbles are arranged, leaves the separator 4.

One typical application, which is preferred in the scope of the present invention, is the carbonation of a beverage, in particular beer. The carbonation is enrichment of $CO_2$ in the respective beverage.

FIGS. 2-6, 8-9 and 11-12 illustrates the drum system and parts of the drive system of separators, different variants of the gas enrichment in a fluid being represented.

Figure 2:
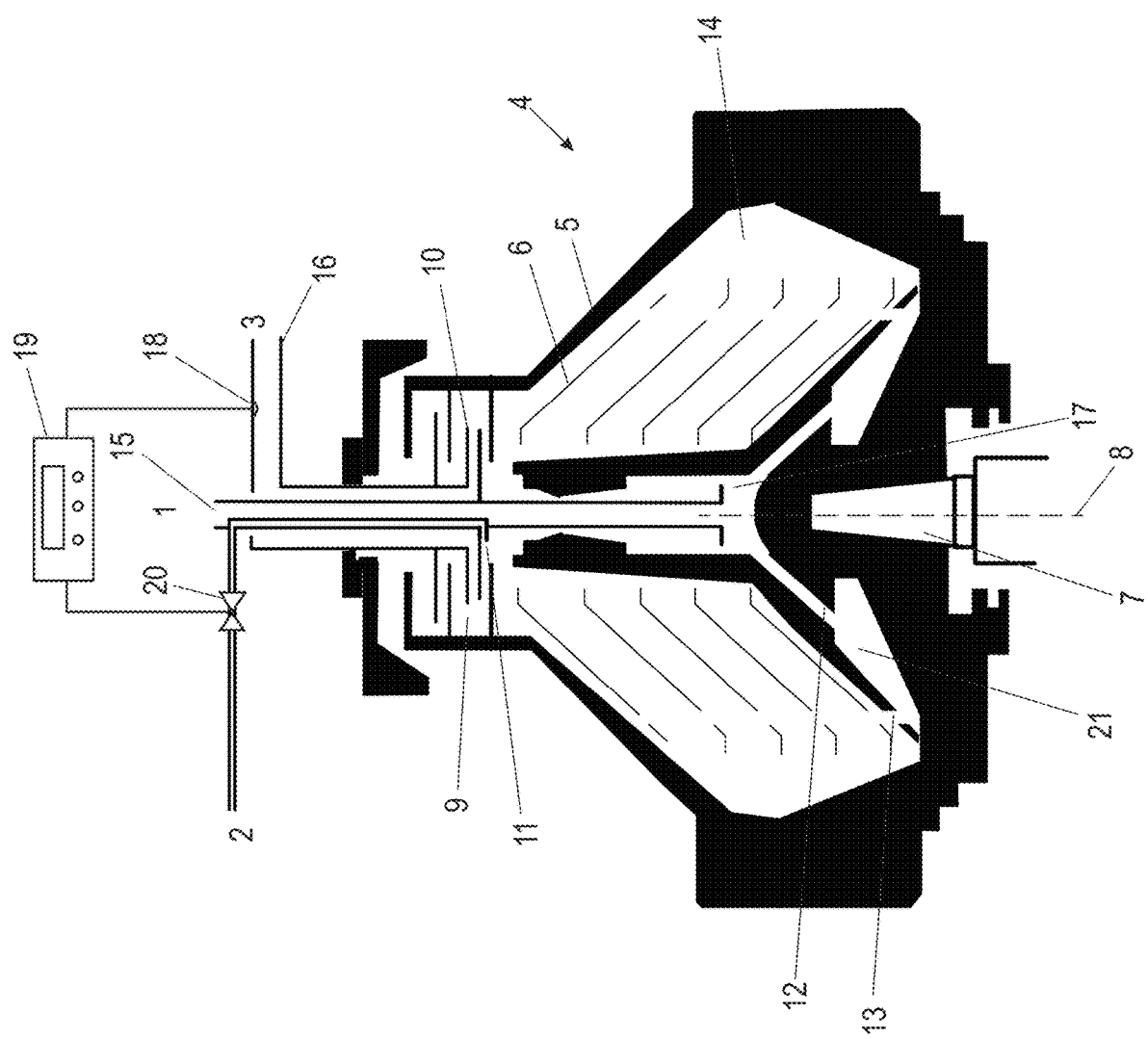
FIG. 2 is a schematic view of a first variant of a separator according to the invention for the centrifugal processing of a liquid.

FIG. 2 illustrates a first alternative embodiment of a separator 4 according to the invention. The separator 4 comprises a drum 5. A plate stack 6 is arranged inside the drum 5. The drum 5 is rotatably mounted and, for executing a rotational movement, comprises a drive spindle 7.

The separator 4 can be filled in the axial direction with a liquid 1 to be processed through an inlet tube 15. The inlet tube 15 opens into a distributor space 17, from which one or more distributor channels 12 discharge the supplied liquid in the radial direction. The liquid is then conveyed into one or more bottom chambers 21, and conveyed from there through an opening 13 into a centrifuge space 14, where centrifugal deposition of solids from the liquid can take place. The centrifugally processed liquid is then conveyed radially outward to radially inward.

In order to collect and discharge a processed liquid 3, the separator 4 comprises a so-called skim chamber 9, into which a gripper 10 opens. The skim chamber 9 is located in the upper region of the separator 4, while the drive spindle 7, and optionally a drive unit connected to the drive spindle, are arranged in the lower region of the separator 4. The centrifugally processed liquid 3 may then be removed from the separator 4, in particular from the skim chamber, by means of the gripper 10 through an outlet tube 16 from the separator 4.

FIG. 2 also illustrates a gas supply line 11 for introducing a gas 2 into the liquid 1 inside the separator 4. In FIG. 2, the gas supply line 11 is arranged below the gripper 10, i.e., in the flow path of the liquid 2 from the centrifuge space 14 to the gripper 10. This line opens into the same skim chamber 9 as the gripper 10. The skim chamber 9 is therefore used as a chamber in order to supply a quantity of gas to the liquid.

A sensor 18 for determining and/or monitoring the gas content inside the liquid may be arranged along the outlet tube 16 or along a pipeline connected thereto. Such a sensor may, for example, be a conductance sensor, or an inline sensor for direct determination of the concentration of the dissolved gas, or another suitable sensor.

After the determination or monitoring of the gas content, adaptation may be carried out. To this end, the measurement signal determined by the sensor 18 is transmitted to a measurement and/or evaluation unit 19 or the control device of the centrifuge. The latter transmits an adjustment signal to a valve 20 which is arranged along the gas supply line, or along a pipeline connected to the gas supply line 11. The valve 20 controls and/or regulates the gas pressure with which the gas 2 is introduced into the gas supply line 11, and from there into the liquid 1. If the gas supply line 11 opens into the region of the skim chamber 9, only small centrifugal forces then act on the liquid before its outlet, and the supplied gas is not expelled, or is expelled only to a small extent, by the centrifugal processing.

Furthermore, the supply of the gas 2 through the gas supply line 11 takes place not far from the measurement position, or the position of the sensor 18.

The drum 5 delimits a drum interior, inter alia the distributor space 17, the bottom chamber 21, the centrifuge space 14 and the skim chamber 9 being assigned to the drum interior.

Figure 3:
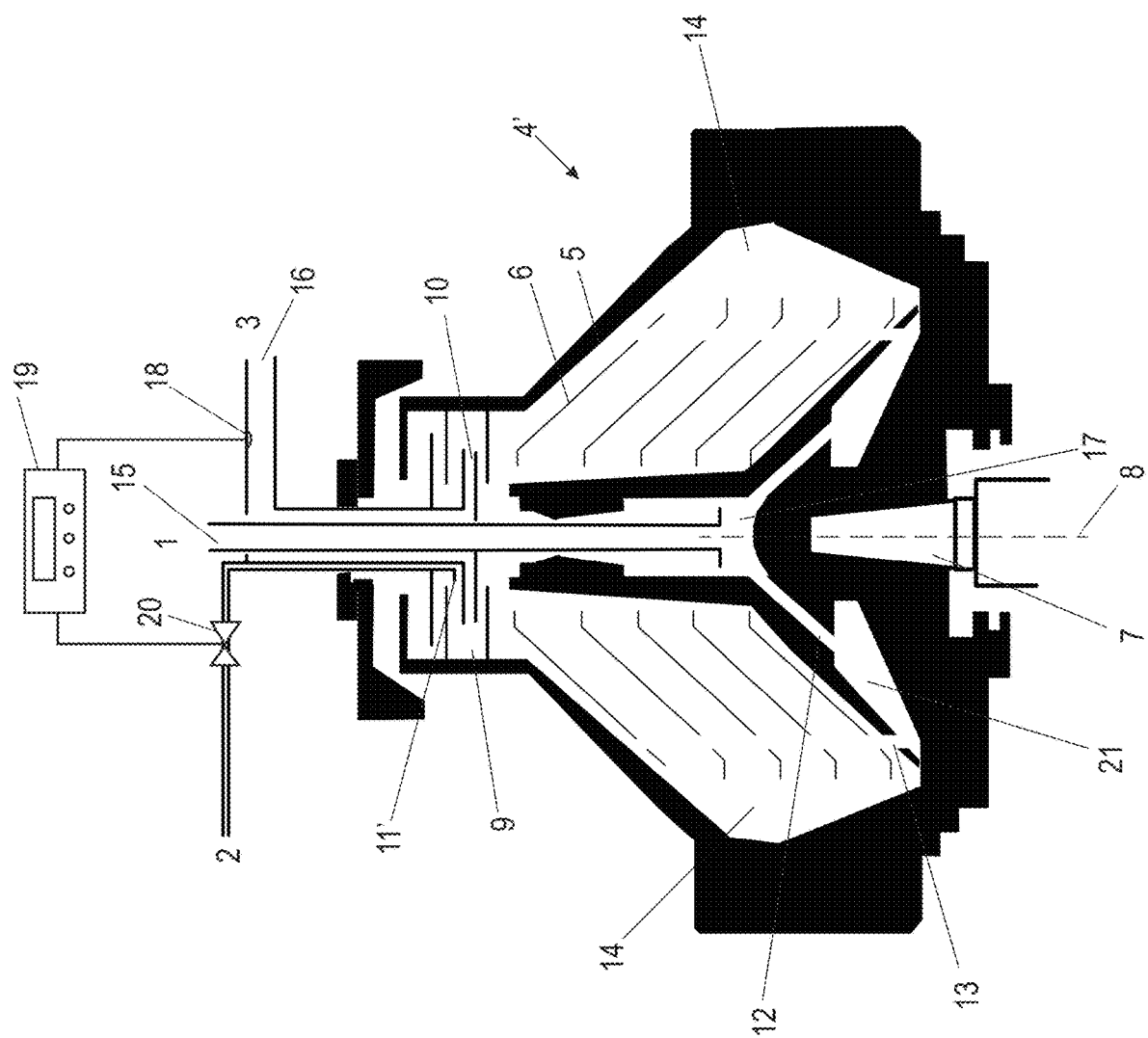
FIG. 3 is a schematic section view of a second variant of a separator according to the invention for the centrifugal processing of a liquid.

FIG. 3 illustrates a similar arrangement to FIG. 2 of a gas supply line 11' inside a separator 4'. The gas supply line 11' in this case is arranged above the gripper 10. The gas supply line 11' in this case likewise opens into the skim chamber 9, and therefore makes the supply possible inside a spatially limited chamber, which inter alia is open to the centrifuge space 14.

Figure 4:
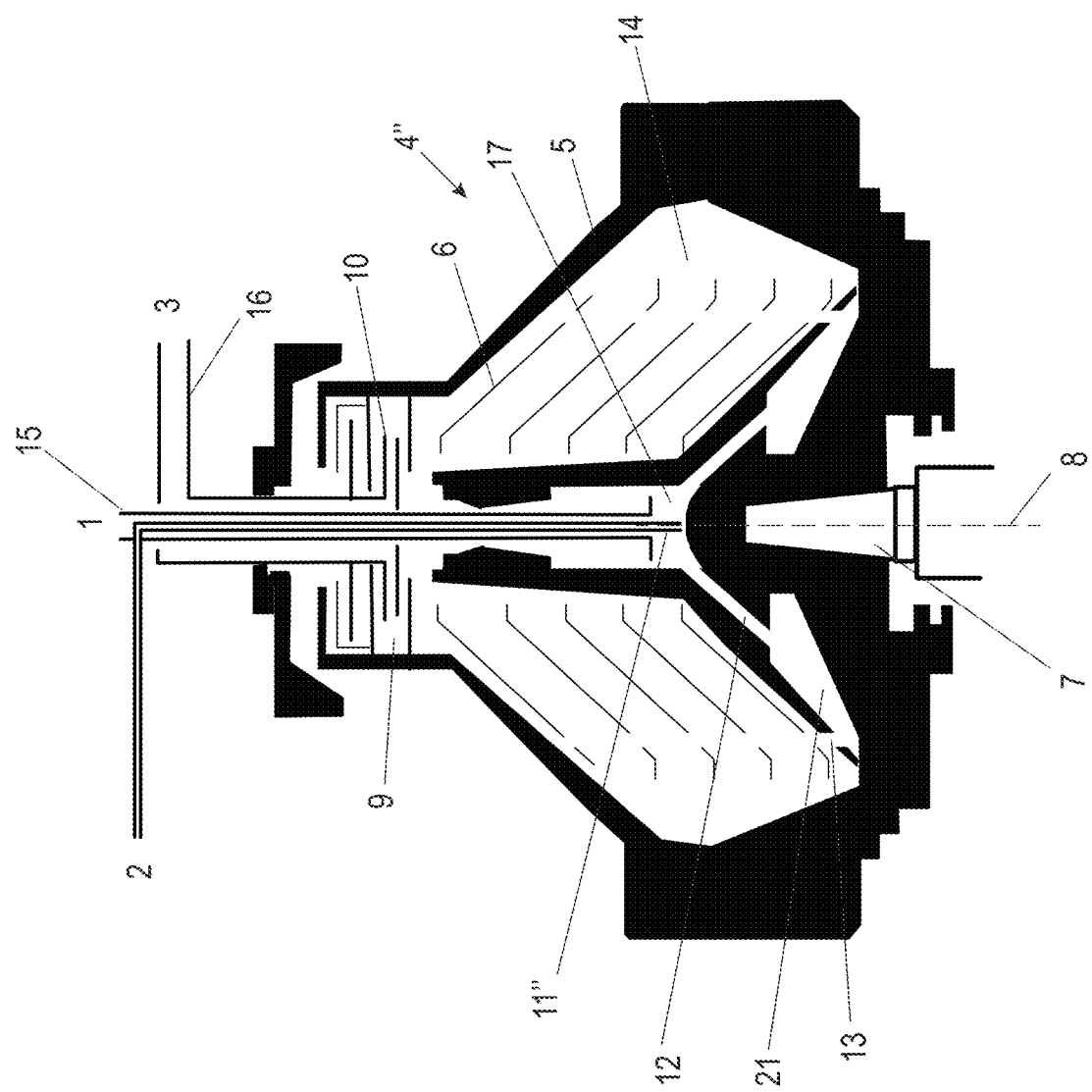
FIG. 4 is a schematic sectional view of a third variant of a separator according to the invention for the centrifugal processing of a liquid.

FIG. 4 illustrates a further variant of a separator 4" according to the invention. In this variant, the gas supply line 11" extends parallel to the supply line tube 15, for example inside the supply line tube 15. The gas supply line 11" opens into the distributor space 17 of the drum 15. The gas supply line 11" in this case protrudes beyond the supply line tube 15 into the distributor space 17. The introduction of gas therefore takes place in the axial direction in this variant, specifically after the supply of a liquid 2 into the drum space before the liquid is conveyed further through the distributor channels 12 in the radial direction.

Figure 5:
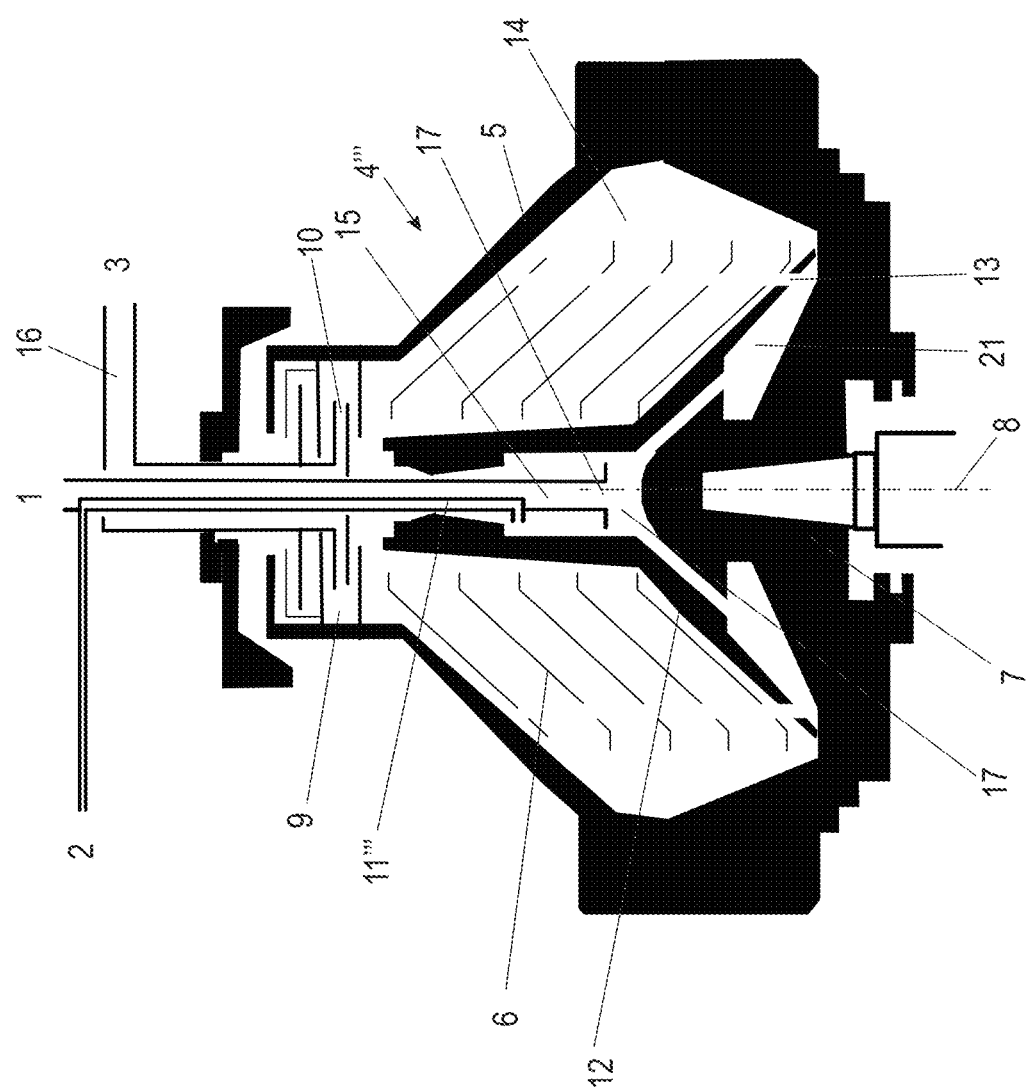
FIG. 5 is a schematic sectional view of a fourth variant of a separator according to the invention for the centrifugal processing of a liquid.

FIG. 5 illustrates a further variant of a separator 4''' according to the invention. In contrast to FIG. 4, in this variant the gas 2 is introduced radially with respect to the rotation axis 8 into the distributor space 17, particularly into an upper region of the distributor space 17. To this end, the gas supply line 11''' extends through the supply line tube 15 and opens radially with respect to the rotation axis 8 into the distributor space 17. In the variants of FIGS. 4 and 5 as well, substantially less space is used for introducing the gas into the liquid in comparison with the centrifuge space 14. This case involves the distributor space 17.

Figure 6:
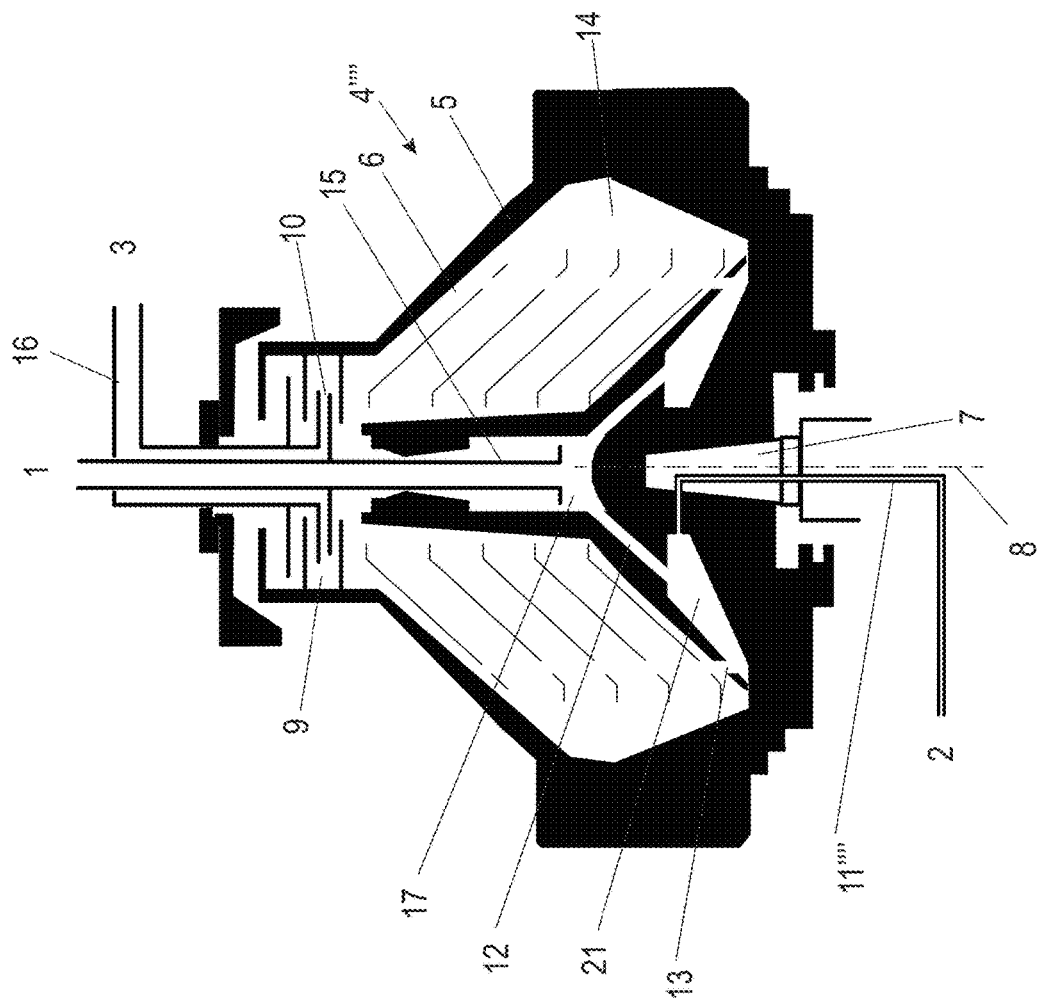
FIG. 6 is a schematic sectional view of a fifth variant of a separator according to the invention for the centrifugal processing of a liquid.

FIG. 6 illustrates a fifth variant of a separator 4"" according to the invention. In this case, the introduction of gas by means of a gas supply line 11"" takes place through the drive spindle 7 and through a drum wall connected to the drive spindle 7. In this case, the introduction of gas takes place radially with respect to the rotation axis 8 into the bottom chamber 21 of the separator 4"", in which chamber the liquid is passed around radially through the distributor channel or channels 12 after the axial supply.

FIG. 7 illustrates a schematic representation of a separator 30, as well as of a supply line of gas 2 and of a liquid 1, as well as the discharge of a gas-containing liquid 3.

Figure 8:
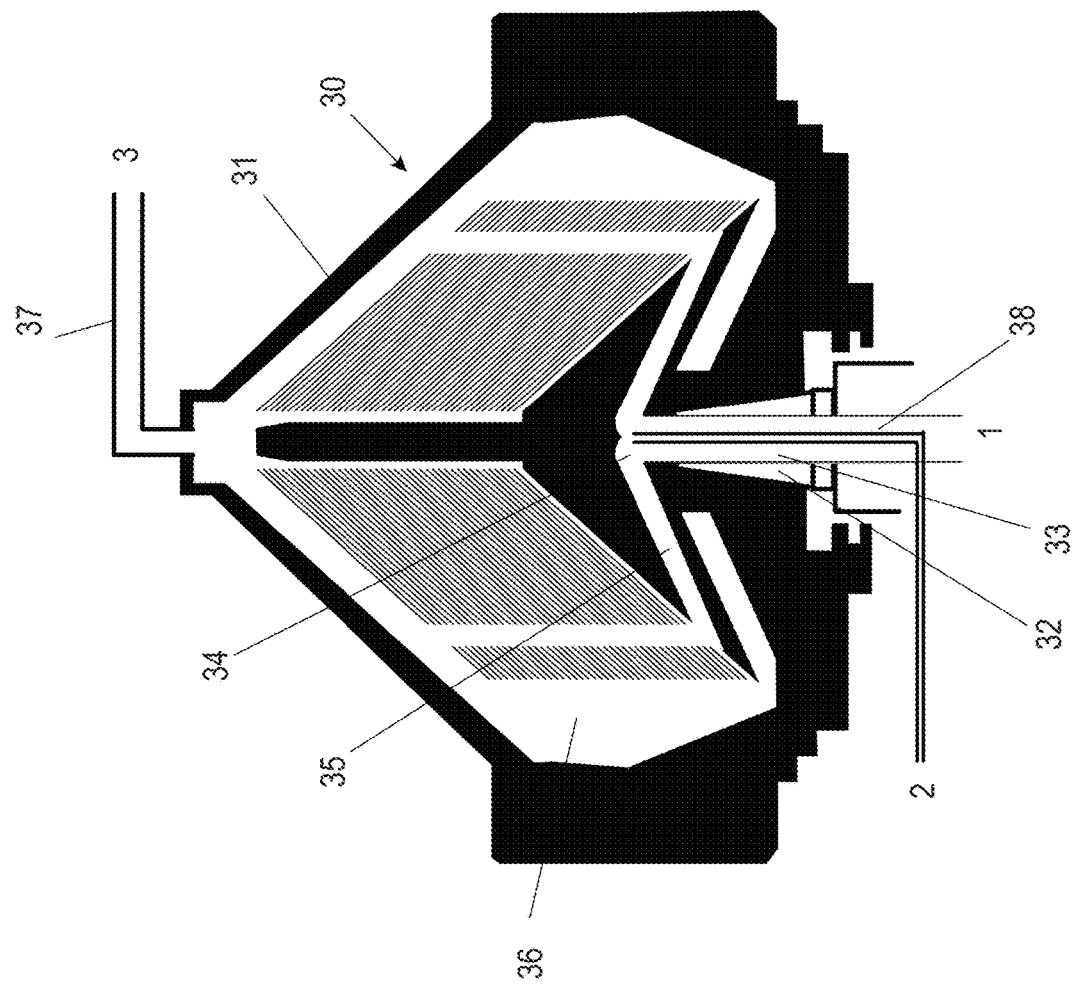
FIG. 8 is a schematic sectional view of a sixth variant of a separator according to the invention for the centrifugal processing of a liquid.

Specifically, the separator 30 in the variant of FIG. 8 comprises a drum 31, which is mounted rotatably about the vertical rotation axis 8. In order to drive the drum 31, a drive spindle 32 is provided. An inlet channel 33 for inlet of the liquid 1 to be processed into a distributor space 34 of the separator 30 extends axially through the drive spindle 32. Distributor channels 35 extend in the radial direction from the distributor space 34. The liquid may leave the distributor channels 35 at the end, and is thereby introduced into a centrifuge space 36. A plate stack is arranged inside the centrifuge space 36. The discharge of the liquid at an axial end of the drum 31 may take place through an outlet tube 37. The introduction of the gas 1 into the separator 30 may take place through a gas supply line 38 which is arranged parallel to, in particular coaxially with respect to, the rotation axis 8 inside the inlet channel 33. The inlet channel preferably also extends coaxially with respect to the rotation axis 8 of the separator 30.

Figure 9:
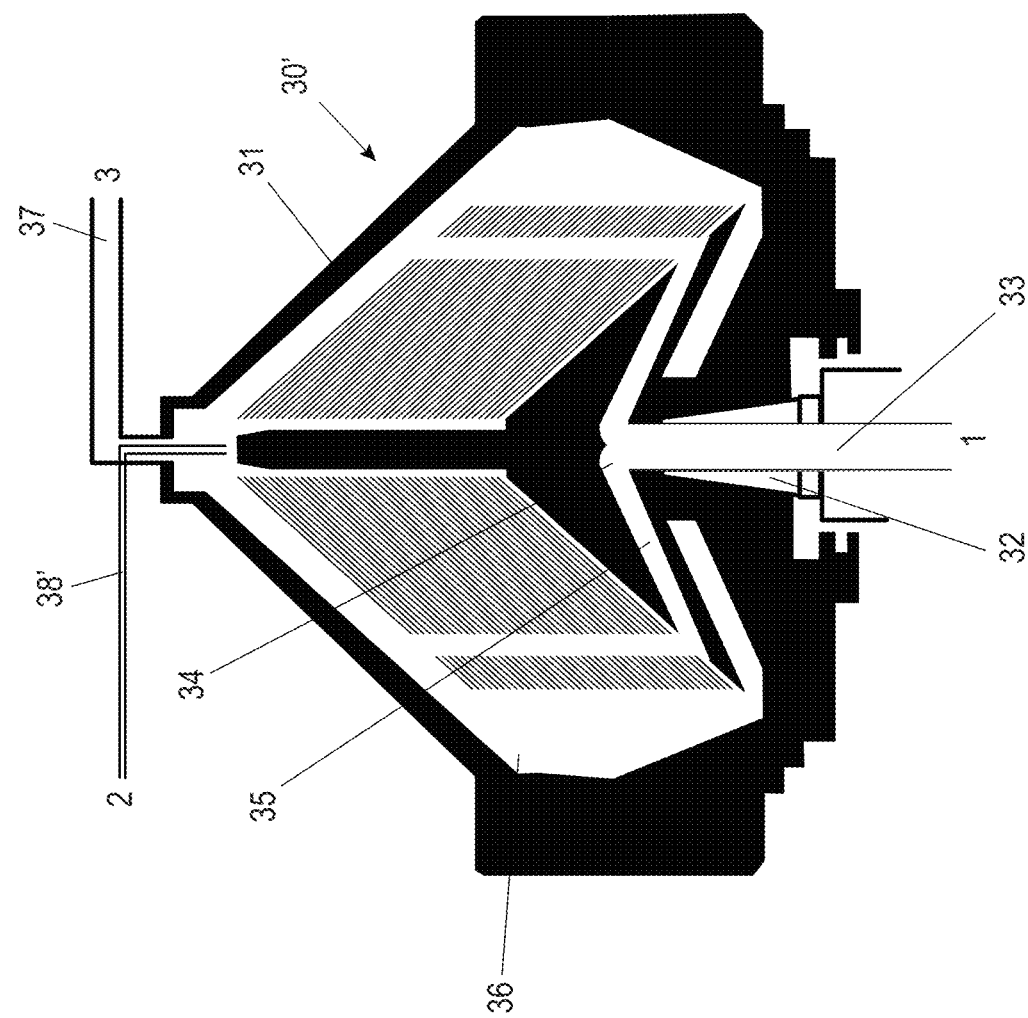
FIG. 9 is a schematic sectional view of a seventh variant of a separator according to the invention for the centrifugal processing of a liquid.

FIG. 9 represents a second alternative embodiment in a modification of the separator 30' of FIG. 8. In this case, the gas supply line 38' is arranged, at least inside the drum 31, coaxially with respect to or parallel to the rotation axis 8 in or along the outlet tube 37.

FIG. 10 illustrates a schematic representation of a supply of two gases 2, 2' and one liquid 1 into a separator 4$^v$.

To this end, the separator 4$^v$ comprises two gas supply lines 11' and 11", which are fed into the upper region of the drum 5.

Figure 11:
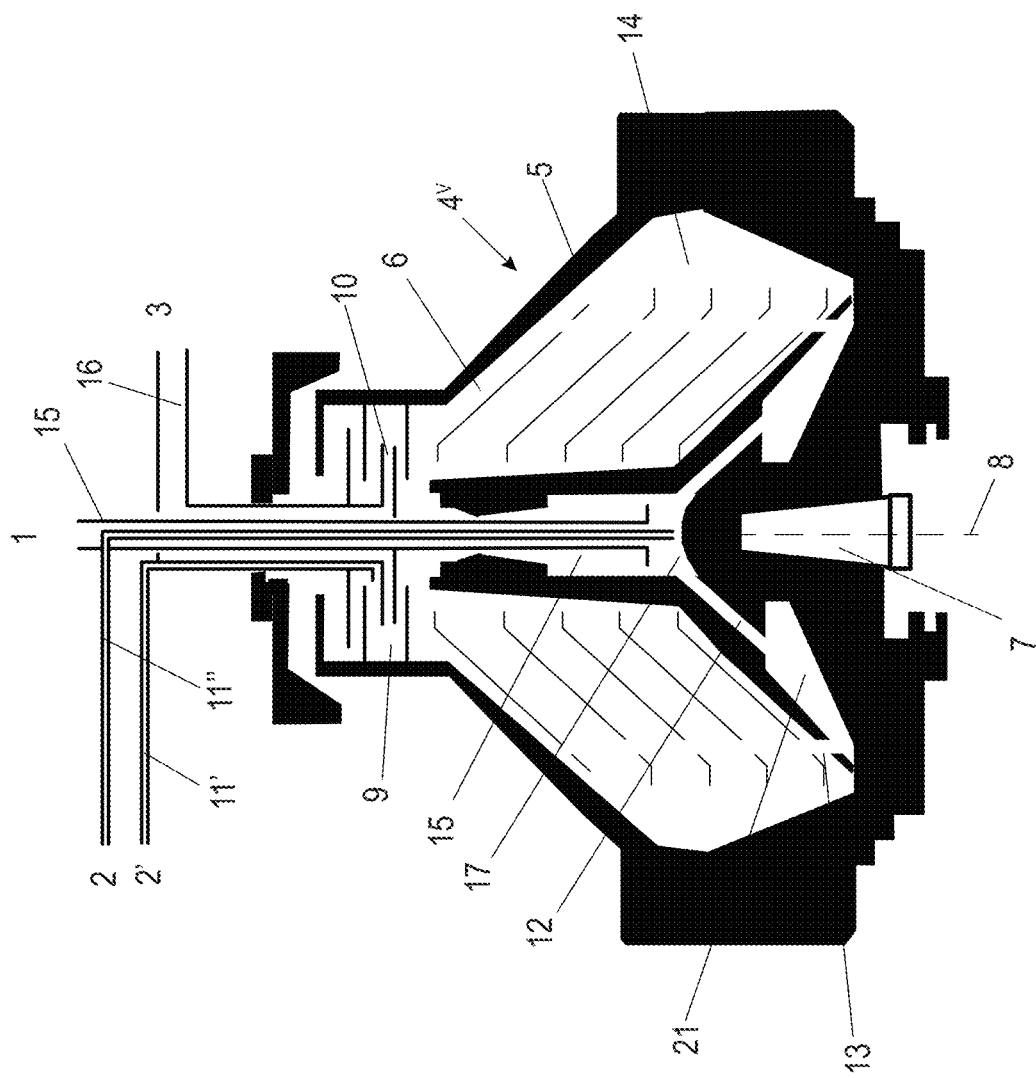
FIG. 11 is a schematic sectional view of an eighth variant of a separator according to the invention for the centrifugal processing of a liquid.

FIG. 11 illustrates a cross section of the separator 4$^v$. A first gas supply line 11' in the region of the skim chamber 9, and a second gas supply line 11", which opens into the distributor space 17, are provided. A first gas can be introduced into the fluid through the first gas supply line 11', and a second gas can be introduced into the fluid through the second gas supply line 11". It is possible for the second gas 2' to be $CO_2$ and for the first gas 2 to be an inert gas, for example nitrogen. The first and second gases may, however, also be the same. In a preferred application, the second gas 2' may be introduced into the liquid 1 in the distributor space 17 of the separator 4$^v$, while the first gas is used in the skim chamber 9 as a blanket gas in order to counteract effervescence of $CO_2$ from the liquid during the centrifugal processing of the liquid. Ideally a gas cushion thereby provided in the skim chamber 9 may not extend as far as the opening of the gripper 10 but lie above the gripper.

Figure 13A:
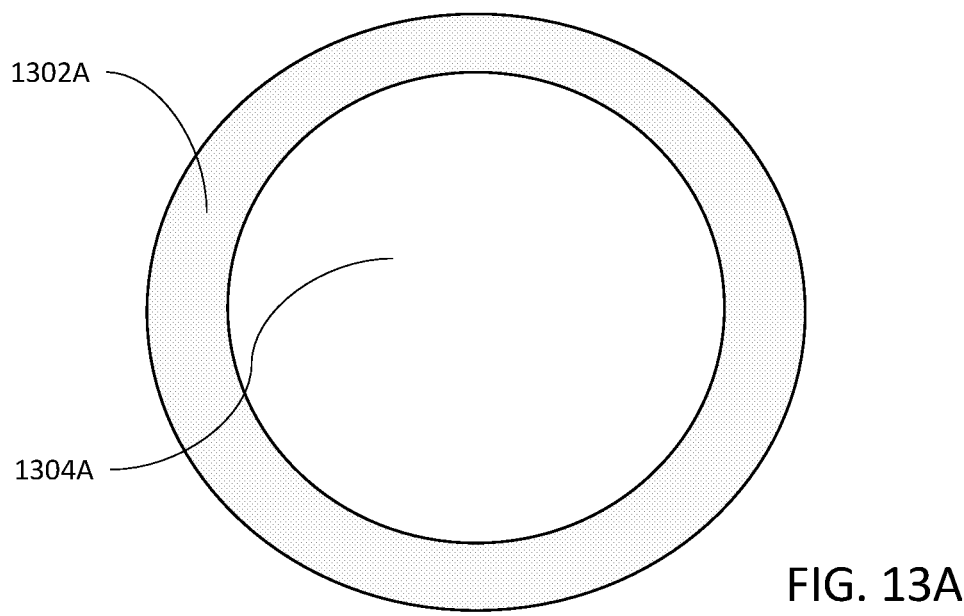
FIGS. 13A and 13B are schematic diagrams of a fluid-mechanical seal.
Figure 13B:
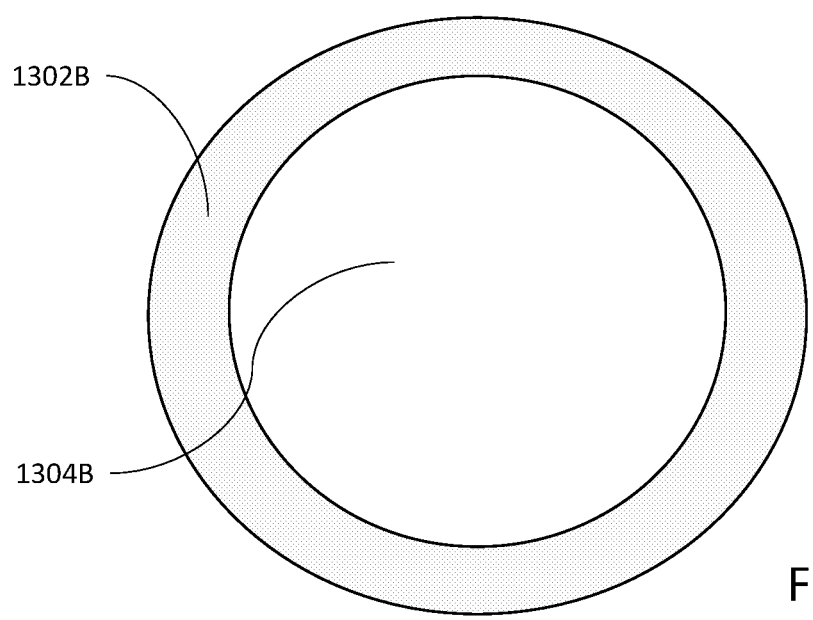

Such a mode of operation presupposes sealing of the rotating system, as already described above. The drum, and explicitly the separating space, may be sealed or isolated from the surroundings by friction seals, for example dry face seals, in the inlet region and/or in the outlet region. As an alternative, however, this sealing or isolation may also be carried out using fluid-mechanical seals. As illustrated in FIGS. 13A and 13B, in the case of these seals, the sealing is produced by inserting a stationary disk 1302A into a rotating liquid ring 1304B. As an alternative, however, a rotating disk 1302B may also be inserted into a stationary liquid ring 1304B.

Figure 12:
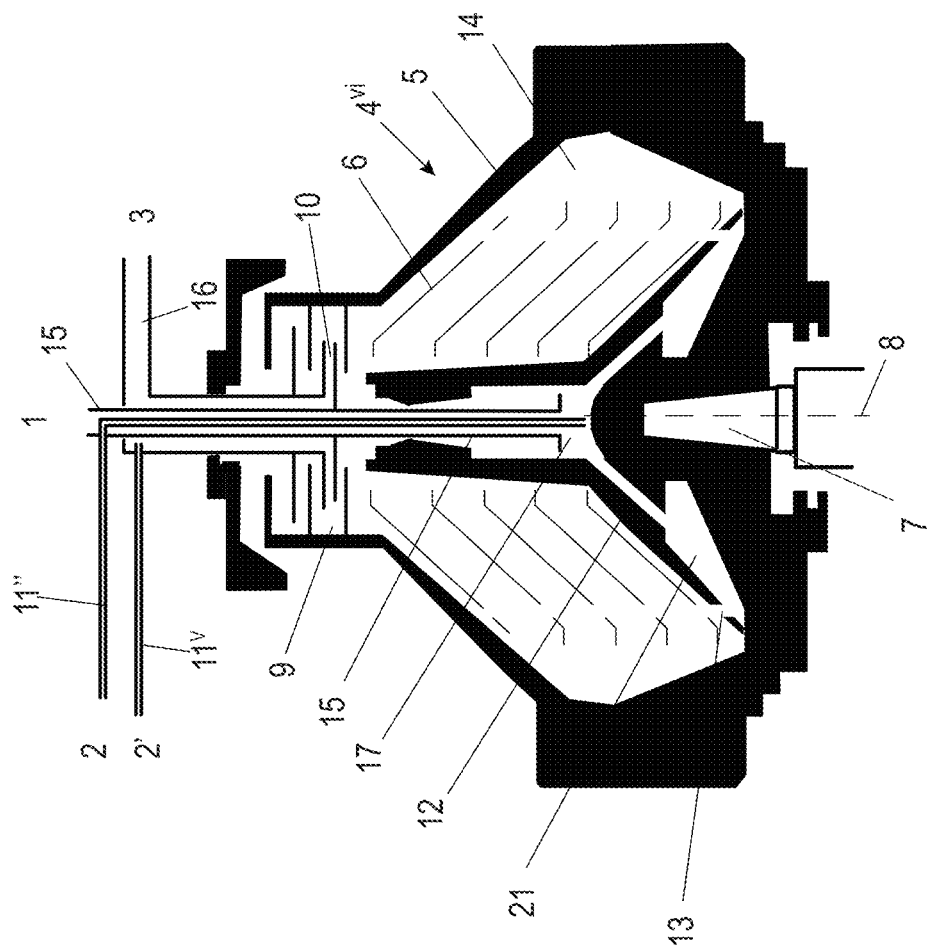
FIG. 12 is a schematic sectional view of a ninth variant of a separator according to the invention for the centrifugal processing of a liquid.

FIG. 12 illustrates a further variant, modified in relation to FIG. 11, of a separator 4$^{vi}$. In this case, instead of inside the skim chamber 9, a first gas 2 is supplied through a gas supply line 11$^v$ inside the outlet tube 16.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCES 1 liquid
2 gas
2' gas
3 gas-containing liquid
4 separator
4' separator
4" separator
4''' separator
4"" separator
4$^v$ separator
4$^{vi}$ separator
5 drum
6 plate stack
7 drive spindle 8 rotation axis
9 skim chamber
10 gripper
11 gas supply line
11' gas supply line
11" gas supply line
11''' gas supply line
11'''' gas supply line
11$^v$ gas supply line
12 distributor channels
13 opening
14 centrifuge space
15 inlet tube
16 outlet tube
17 distributor space
18 sensor
19 measurement and/or evaluation unit
20 valve
21 bottom chamber
30 separator
30' separator
31 drum
32 drive spindle
33 inlet channel
34 distributor space
35 distributor channel
36 centrifuge space
37 outlet tube
38 gas supply line
38' gas supply line

What is claimed is:

1. A separator, comprising:
a rotatably mounted drum having a drum interior configured for centrifugal processing of a liquid, wherein the drum interior includes a distributor space;
a liquid supply line tube that opens into the distributor space; and
a gas supply line configured to introduce gas into the liquid, wherein the gas supply line extends along a same direction as the liquid supply line tube, opens into the distributor space, and protrudes beyond the liquid supply line tube into the distributor space,
wherein the separator has a vertical rotation axis,
wherein the separator has a sealed configuration in which a separating space of the rotatably mounted drum is sealed or isolated from surroundings by fluid-mechanical seals.

2. The separator of claim 1, wherein the gas supply line is a supply line tube and/or as a supply line channel.

3. The separator of claim 1, further comprising:
a sensor configured to determine gas content in gas-containing liquid in the separator.

4. The separator of claim 3, further comprising:
an outlet tube configured to discharge a gas-containing liquid from the separator, wherein the outlet tube comprises the sensor.

5. The separator of claim 1, further comprising:
a measurement and/or evaluation unit configured to adjust gas pressure of the gas supplied through the gas supply line.

6. The separator of claim 5, further comprising:
a valve configured to adjust a gas pressure of the gas supplied through the gas supply line, wherein the valve is arranged along the gas supply line and is adjustable by the measurement and/or evaluation unit.

7. The separator of claim 1, wherein the distributor space configured for radial discharge of the liquid.

8. The separator of claim 1, further comprising:
a skim chamber, wherein a second gas supply line opens into the skim chamber.

9. The separator of claim 1, further comprising:
a drive spindle, wherein the rotatably mounted drum is driven by the drive spindle, the gas supply line is configured, at least in regions, as a channel inside the drive spindle, the channel opens into the drum interior of the rotatably mounted drum.

10. The separator of claim 1, further comprising:
an additional gas supply line configured to introduce gas at a different position of the rotatably mounted drum than the gas supply line.

11. A method for operating a separator, the method comprising:
rotating a rotatably mounted drum having a drum interior configured for centrifugal processing of a liquid, wherein the rotatably mounted drum rotates about a vertical rotation axis and the drum interior includes a distributor space;
introducing liquid into the distributor space via a liquid supply line tube;
introducing, via a gas supply line, gas into the liquid, wherein the gas supply line extends along a same direction as the liquid supply line tube, opens into the distributor space, and protrudes beyond the liquid supply line tube, wherein the gas is introduced after the liquid is introduced,
wherein the separator has a sealed configuration in which a separating space of the rotatably mounted drum is sealed or isolated from surroundings by fluid-mechanical seals.

12. The method of claim 11, further comprising:
introducing, via a second gas supply line, a second gas into the liquid after the introducing the first gas.

13. The method of claim 12, wherein the first and/or second gas is $CO_2$.

14. The method of claim 11, wherein the liquid is beer.

* * * * *